2,389,344

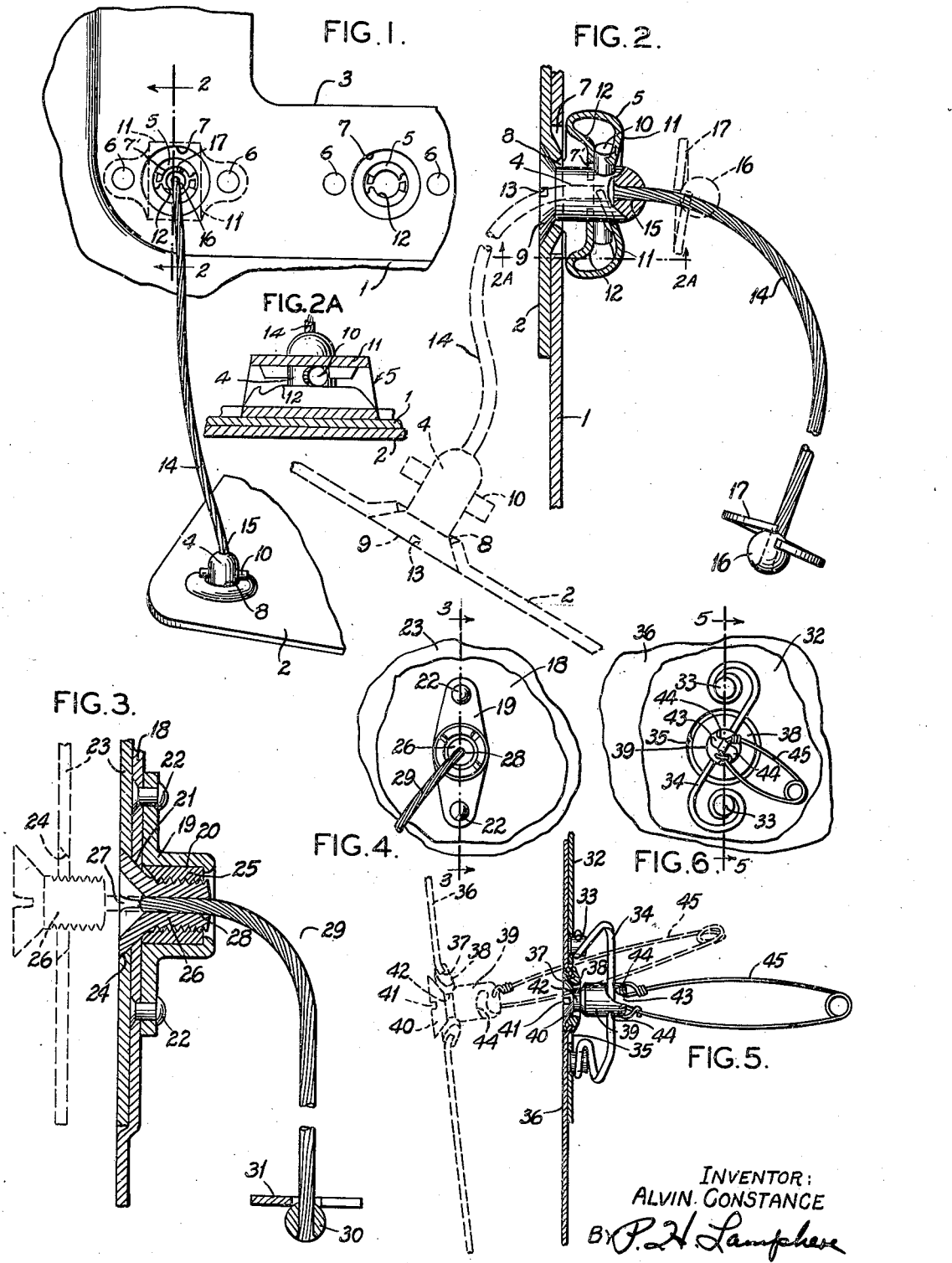
Nov. 20, 1945.     A. CONSTANCE     2,389,344
RETAINING DEVICE
Filed Feb. 24, 1944
INVENTOR:
ALVIN CONSTANCE
BY P. H. Lamphere
ATTORNEY Patented Nov. 20, 1945

UNITED STATES PATENT OFFICE 2,389,344

RETAINING DEVICE

Alvin Constance, Carsonville, Mo.

Application February 24, 1944, Serial No. 523,763

11 Claims. (Cl. 24—221)

My invention relates to a retaining device and more particularly to means for retaining a connection between separable members when a holding element is removed.

One of the objects of my invention is to provide improved means for retaining a connection between separable members after the holding or locking means associated with said member has been conditioned to permit separation.

Another object of my invention is to so associate the connecting means with holding or locking means for separable members that the holding means will act as part of the retaining connecting means.

Still another object of my invention is to so construct the retaining connecting means that it can be disconnected from the separable members when it is desired to thus permit complete disassociation of said members.

A more specific object of my invention is to provide a holding or locking element with a connecting means which can be so detachably arranged with a member to which the holding element secures another and separable member that the connecting means and holding element will act as a leash to permit the members to have limited separation but not complete disassociation.

Other objects of my invention will become apparent from the following description taken in connection with the accompanying drawing in which Figure 1 is a view showing my improved retaining connecting means associated with separable members and a holding or locking means therefor, said members being shown in separated positions;

Figure 2 is a sectional view taken on the line 2—2 of the structure shown in Figure 1 but showing the holding or locking element in operative position for locking the members together, said figure also showing in dashed lines a separated condition of the members;

Figure 2A is a sectional view taken on the line 2A—2A of Figure 2 and showing additional details of the receptacle;

Figure 3 is a sectional view showing my improved connecting means associated with a different type of holding or locking means for separable members said view being taken on the line 3—3 of Figure 4;

Figure 4 is a rear view of the structure shown in Figure 3;

Figure 5 is a sectional view showing my improved connecting means associated with still a different type of holding or locking means for separable members said view being taken on the line 5—5 of Figure 6; and Figure 6 is a rear view of the structure shown in Figure 5.

Referring first to Figures 1 and 2, numeral 1 indicates a body member, which member may be a part of a frame, a box body, and so forth, and 2 indicates a plate member which is adapted to be detachably secured to the body member 1. This plate may take the form of a cover plate for an opening 3 in the body member or it may be a cover for a box in which case it may be hinged to the box body of which member 1 is a part. Regardless of the structure in which the body member and plate member are elements, they are arranged to be detachably secured together by a removable holding means whereby the plate can be separated from the body member whenever desired. The particular removable holding or locking means shown in Figures 1 and 2 is of known construction and comprises essentially a stud 4 and a cooperating receptacle 5. The receptacle 5 is secured by rivets 6 to the inside surface of member 1 so as to have its opening 7' aligned with an opening 7 in the body member. The stud 4 extends through an opening 8 in plate 2 and is formed with a head 9 for engaging the outer surface of the plate adjacent the opening. The body portion of the stud carries a cross-pin 10 for cooperating with the receptacle to thereby lock the stud in position and thus secure the plate to the body member. The body member has wings 11 and cam portions 12 whereby the cross-pin, when placed in the receptacle and turned through an angle, will pull the head of the stud inwardly and lock the stud in holding position. The head of the stud is provided with a slot 13 for receiving any suitable instrument to bring about the turning of the stud to lock or unlock it with the receptacle. It is to be noted that cross-pin 10 is positioned in the stud after the stud is extended through the opening 8 in the plate and, therefore, the cross-pin will prevent the stud from becoming detached from the plate.

In accordance with my invention which is embodied in structure associated with one of the holding means shown in Figure 1, I attach to the inner end of stud 4, one end of a flexible cable 14, said cable end being either swaged or soldered into an axial bore 15 in the stud. On the other end of the cable there is provided a ball 16, said ball being of a diameter somewhat less than the diameter of the stud so that it can freely pass through the central opening in the receptacle and the larger opening 7 in the body member 1. Positioned on the cable between the stud and the end ball 16 is a split washer 17 having an opening of such diameter that it cannot pass over the ball on the end of the cable. Its external diameter is such that it cannot be passed through the opening 7' in the receptacle. This washer can be removed from the cable by merely twisting the washer so as to separate the ends sufficiently that the cable can pass between them.

With the above cable arrangement associated with the stud it is seen that the stud can be removed from the receptacle in its usual manner to allow the plate member to be separated from the body member. The extent of separation, however, will be limited by the length of the cable. In other words, the cable acts as a leash to maintain the plate connected with the body and prevent misplacement or loss of plate 2. The cable can be made as long as desired so that the plate can assume a position when the stud is removed that it will not interfere with free access to the opening 3 in the body member. If it should be desired to completely disassociate the plate from the body member, such can be done very readily by merely twisting the end of the washer 17 and removing it from the cable. The ball 16 is then free to pass through the opening in the receptacle. Since cable 14 is flexible, the plate can be moved around freely and also permitted to hang from the body member.

In Figures 3 and 4 the cable is shown as associated with a different type of holding or locking means for securing the plate and body member together. As shown, the body member 18 has mounted on its back surface a receptacle 19 having a bore 20 aligned with an opening 21 in the body member, the means shown for securing the receptacle to the body member being rivets 22. The plate 23 is provided with the opening 24. The bore 20 of the receptacle carries an internally threaded sleeve 25 for cooperation with a holding screw 26 having a head which engages plate 23 so that when the screw is "turned home" by the slot 27 the head will clamp the plate to the body member. The body of the screw is provided with an axial bore 28 in which is secured one end of a flexible cable 29. The other end of this cable has secured thereto a ball 30 and carried by the cable is a split washer 31.

With the arrangement just described it is seen that when the screw 26 is unscrewed to permit separation of the plate from the body member, the cable 29, together with washer 31, will prevent the cable from being drawn through the bore of the threaded sleeve carried by the receptacle and thus provide leash means for maintaining the plate connected with the body member in the same manner as the cable and washer do in the structure shown in Figures 1 and 2. If it should be desired to completely disconnect the screw and plate from the body member, it can be quickly done by merely twisting the split washer and removing it from the cable. When this is done, ball 30 will be free to pass through the opening in the receptacle.

In Figures 5 and 6 I have shown another type of connecting means for use with a third type of holding or locking means between two members. As shown in these figures, the body member 32 has secured to its rear surface, by rivets 33, an S-shaped element 34 which extends across an opening 35 in the body member. The separable plate 36 is provided with an opening 37 in which is mounted a bearing ring 38. Extending through this ring is a holding stud 39 having a head 40 provided with a tool receiving slot 41. The stud adjacent the head is formed with an annular groove 42 for receiving the inner portion of the bearing ring 38 to thus hold the stud in plate 36. The inner end of the stud is provided with a cross-slot 43 with which connect opposed curved slots 44 whereby the stud may be locked to element 34 by positioning the stud so that the element will be received in the cross-slot and then, upon turning of the stud, the element will be moved into the locked position in the curved slots.

Secured to the end of the stud is a looped wire element 45. One end of said element is secured to the end of the stud on one side of the cross-slot 43 and the other end of the element is secured to the stud on the other side of the cross-slot. The securing of said ends is accomplished by looping the wire through holes and twisting the ends as shown. The arrangement results in the looped element acting as a leash for the stud so that when it is detached from element 34 and the plate 36 permitted to become separated from the body member 32, the looped end of the element will engage element 34 and thus provide means connecting the plate to the body member so that the plate cannot become misplaced or lost. If it should be desired to completely disassociate the plate from the body member 32, this can be done by merely detaching one end of the looped wire from the end of the stud. This will permit the looped element to be arranged so that element 34 will not extend through the loop. The element can now be freely pulled through opening 35.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus for limiting the extent of separation of separable members which are provided with openings and having associated therewith a detachable holding means comprising a holding element positionable in the openings and provided with a headed portion for cooperation with one of the separable members and detachable means mounted on said holding element and engageable with cooperating means on the other of the separable members to thereby hold the members secured together, said apparatus comprising an elongated element secured at one end to the holding element and capable of being pulled through the opening in said other of the separable members when the holding means is caused to be inoperative, and means on said elongated element for preventing the other end of the elongated member from being drawn through the opening in said other of the separable members, said elongated element and said last named means together with the holding element cooperating with the separable members to positively limit the extent of separation thereof.

2. In apparatus for limiting the extent of separation of separable members which are provided with openings and having associated therewith a detachable holding means comprising a holding element positionable in the openings and provided with a headed portion for cooperation with one of the separable members and detachable means mounted on said holding element and engageable with cooperating means on the other of the separable members to thereby hold the members secured together, said apparatus comprising a flexible cable secured at one end to the holding element and capable of being pulled through the opening in said other of the separable members when the holding means is caused to be inoperative, and means on said flexible cable for preventing the other end of the cable from being drawn through the opening in said other of the separable members, said cable and said last named means together with the holding element cooperating with the separable members to positively limit the extent of separation thereof.

3. In apparatus for limiting the extent of separation of separable members which are provided with openings and having associated therewith a detachable holding means comprising a holding element positionable in the openings and provided with a headed portion for cooperation with one of the separable members and detachable means engageable mounted on said holding element and with cooperating means on the other of the separable members to thereby hold the members secured together, said apparatus comprising a flexible cable secured at one end to the holding element and capable of being pulled through the opening in said other of the separable members when the holding element is detached, and stop means carried by the cable for limiting the length of cable which can be drawn through the opening and for permitting the cable to support one of the separable members from the other.

4. In apparatus for limiting the extent of separation of separable members which are provided with openings and having associated therewith a detachable holding means comprising a holding element positionable in the openings and provided with a headed portion for cooperation with one of the separable members and detachable means mounted on said holding element and engageable with cooperating means on the other of the separable members to thereby hold the members secured together, said apparatus comprising an elongated element secured at one end to the holding element and capable of being pulled through the opening in said other of the separable members when the holding element is detached, and means on said elongated element for limiting the length of the element which can be drawn through the opening and for permitting the elongated element to support one of the separable members from the other, said last named means including means operable at will to free the element for passage through the opening.

5. In apparatus of the class described, separable members provided with aligning openings, detachable means for securing the members together including a removable holding element extending through the openings and having a head engageable with one member when in a securing position and means for limiting the extent of separation of the members when the element is removed from a securing position, said means comprising an elongated member secured to the element at the end opposite the head and capable of being drawn through the opening in the member not engaged by the head of said element, and stop means on the elongated member for permitting a limited length only of the elongated member to be drawn through said opening, said stop means and the elongated member together with the holding element cooperating with the separable members to support one from the other.

6. In apparatus of the class described, separable members provided with aligning openings, detachable means for securing the members together including a removable holding element extending through the openings and having a head engageable with one member when in a securing position, means for preventing detachment of said holding element from the member its head engages and means for limiting the extent of separation of the members when the element is removed from a securing position, said means comprising an elongated member secured to the element at the end opposite the head and capable of being drawn through the opening in the member not engaged by the head of said element when the element is removed, and stop means carried by the elongated member for permitting a limited length only of said member to be drawn through said opening, said stop means and the elongated member together with the holding element cooperating with the separable members to support one from the other.

7. In apparatus of the class described, separable members provided with aligning openings, detachable means for securing the members together comprising a headed stud extendable through the openings so that its head engages the outer surface of one of the members, a receptacle carried by the outer side of the other member, cooperating inter-engaging means on the stud and the receptacle whereby the stud can secure the separable memers in overlying relation, said receptacle having an opening aligned with the opening in the member to which it is secured, a flexible cable secured at one end to the end of the stud which is adapted to cooperate with the receptacle, and a stop means carried by the other end of the flexible member for cooperation with the receptacle to prevent the member from being drawn through the opening in the receptacle and thus establish a connection for limiting the extent of separation of the separable members and for supporting one of the separable members from the other.

8. In apparatus of the class described, separable members provided with aligning openings, detachable means for securing the members together comprising a headed stud extendable through the openings so that its head engages the outer surface of one of the members, a receptacle carried by the outer side of the other member, cooperating inter-engaging means on the stud and the receptacle whereby the stud can secure the separable members in overlying relation, said receptacle having an opening aligned with the opening in the member to which it is secured, a flexible cable secured at one end to the end of the stud which is adapted to cooperate with the receptacle, and a stop means carried by the other end of the flexible member for cooperation with the receptacle to prevent the member from being drawn through the opening in the receptacle and thus establish a connection for limiting the extent of separation of the separable members, said stop means comprising a member secured to the cable and establishing a shoulder and a split washer on the cable, the member secured to the cable being of a size to pass through the receptacle opening and the washer being of such size as to be incapable of passing through said receptacle opening.

9. In apparatus of the class described, separable members provided with aligning openings, detachable means for securing the members together comprising a headed stud extendable through the openings so that its head engages the outer surface of one of the members, a cross-pin for the stud, said cross-pin preventing removal of the stud from the member its head engages, a receptacle carried by the outer side of the other member and carrying means for receiving the cross-pin to secure the separable members in overlying relation, said receptacle having an opening aligned with the opening in the member to which it is secured, a flexible cable secured at one end to the end of the stud which is adapted to cooperate with the receptacle, and a stop means carried by the other end of the flexible member for cooperation with the receptacle to prevent the member from being drawn through the opening in the receptacle and thus establish a connection for limiting the extent of separation of the separable members and for permitting one member to be supported from the other.

10. In apparatus of the class described, overlying separable members provided with aligning openings, detachable means for securing the members together comprising a headed stud extendable through the openings so that its head engages the outer surface of one of the members and being provided with an attaching slotted end, an element carried by the outer side of the other member and extending across the opening therein, said element being capable of being received in the slotted end of the stud to thereby hold said stud in a securing position, and a looped element having its ends secured to the stud, said looped element being arranged so that its loop will receive the element with which the slotted end of the stud cooperates when the stud is removed and thereby establish a connection between the separable members permitting limited separation.

11. In apparatus of the class described, overlying separable members provided with aligning openings, detachable means for securing the members together comprising a headed stud extendable through the openings so that its head engages the outer surface of one of the members and being provided with an attaching slotted end consisting of a cross-slot and connecting curved slots, an element carried by the outer side of the other member and extending across the opening therein, said element being capable of being received through the cross-slot and positioned in the curved slots of the stud when the stud is turned to thereby hold said stud in a securing position, and a looped wire having its ends secured to the stud on opposite sides of the cross-slot thereof so as to receive in its loop the element carried by said member when the stud is detached from said element.

ALVIN CONSTANCE.